United States Patent [19]

Blackburn et al.

[11] Patent Number: 4,487,344
[45] Date of Patent: Dec. 11, 1984

[54] PANNIER CARRIER FOR BICYCLES

[76] Inventors: James R. Blackburn, 303 Casitas Bulevar, Los Gatos, Calif. 95030; James J. Gentes, 1010 Gale Dr., Campbell, Calif. 95008

[21] Appl. No.: 288,104

[22] Filed: Jul. 29, 1981

[51] Int. Cl.[3] .............................................. B62J 9/00
[52] U.S. Cl. .................................. 224/39; 224/30 R; 224/32 R; 280/289 A
[58] Field of Search ................. 224/32 R, 32 A, 30 R, 224/31, 33 R, 33 A, 36, 38, 39, 41, 35, 37; 280/202, 289 A

[56] References Cited

U.S. PATENT DOCUMENTS

| | | | |
|---|---|---|---|
| 1,105,435 | 7/1914 | Howell | 224/32 A |
| 3,937,374 | 2/1976 | Hine, Jr. | 224/32 A |

FOREIGN PATENT DOCUMENTS 442104 2/1936 United Kingdom ............. 224/39 R

*Primary Examiner*—Stephen Marcus
*Assistant Examiner*—Robert Petrik

*Attorney, Agent, or Firm*—Hamrick, Hoffman, Guillot & Kazubowski

[57] ABSTRACT

A pannier carrier (23, 23') for bicycles including a frame arrangeable substantially centered with respect to an associated bicycle wheel for supporting carrying bags (70). The frame is formed by a pair of mirror-image open frameworks (26, 26') disposed on respective sides of a turning fork (12) of an associated bicycle (10) for proper distribution of weight. Attachment of these frameworks (26, 26') to the turning fork (12) is accomplished for each of the frameworks (26, 26') by a connecting bracket (42) securable to an apertured lug (22) conventionally provided on each branch (16, 16') of a turning fork (12) of a bicycle (10) adjacent the point of attachment of the axle of the associated wheel (20), and by a standoff (60, 60') which space the frameworks from the associated branches (16, 16') to offset the slant of the turning fork branches. The frameworks (26, 26') can be spread apart and rigidified by a spreader bar (76) which can have an article support frame (92) provided at its top portion.

12 Claims, 6 Drawing Figures

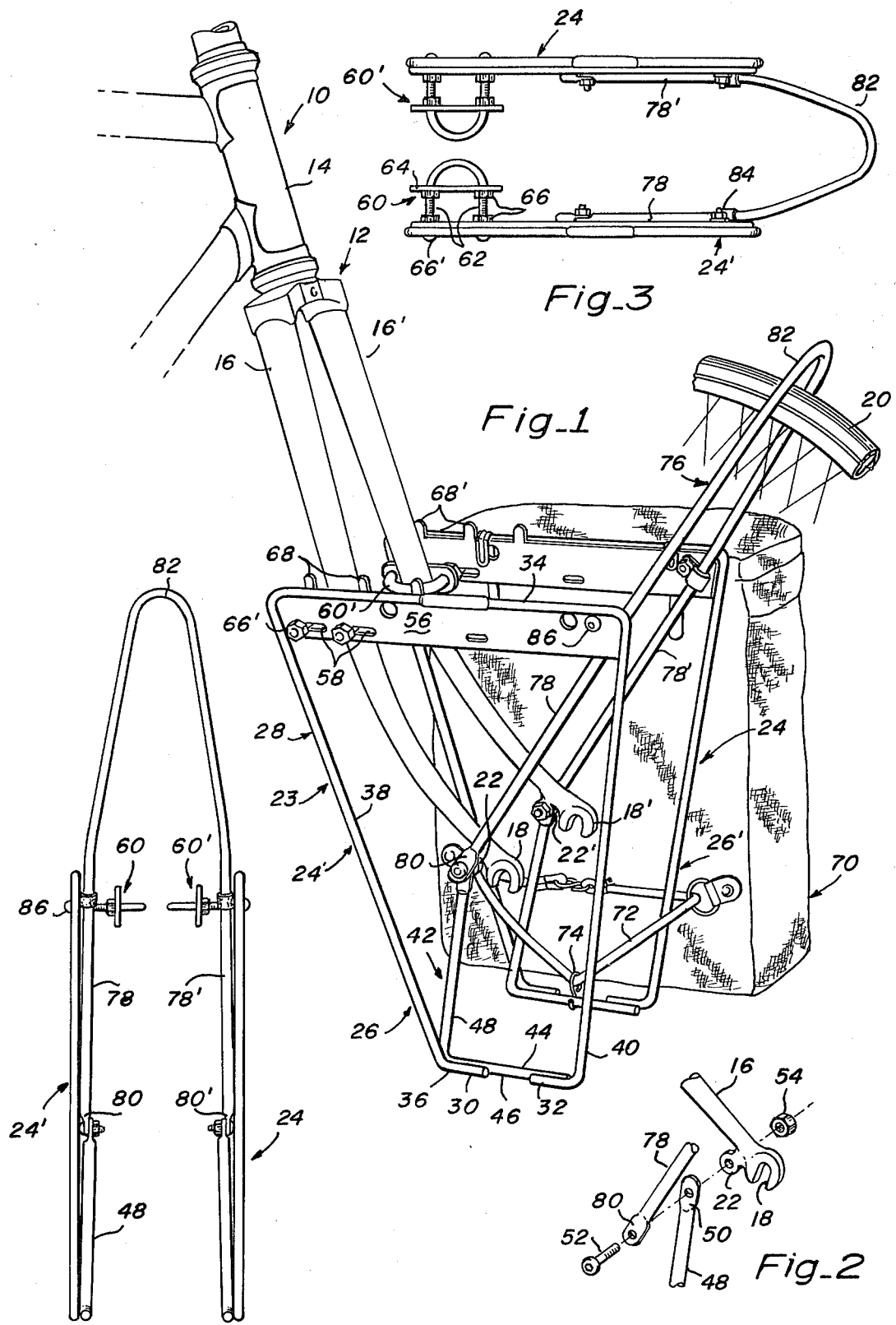

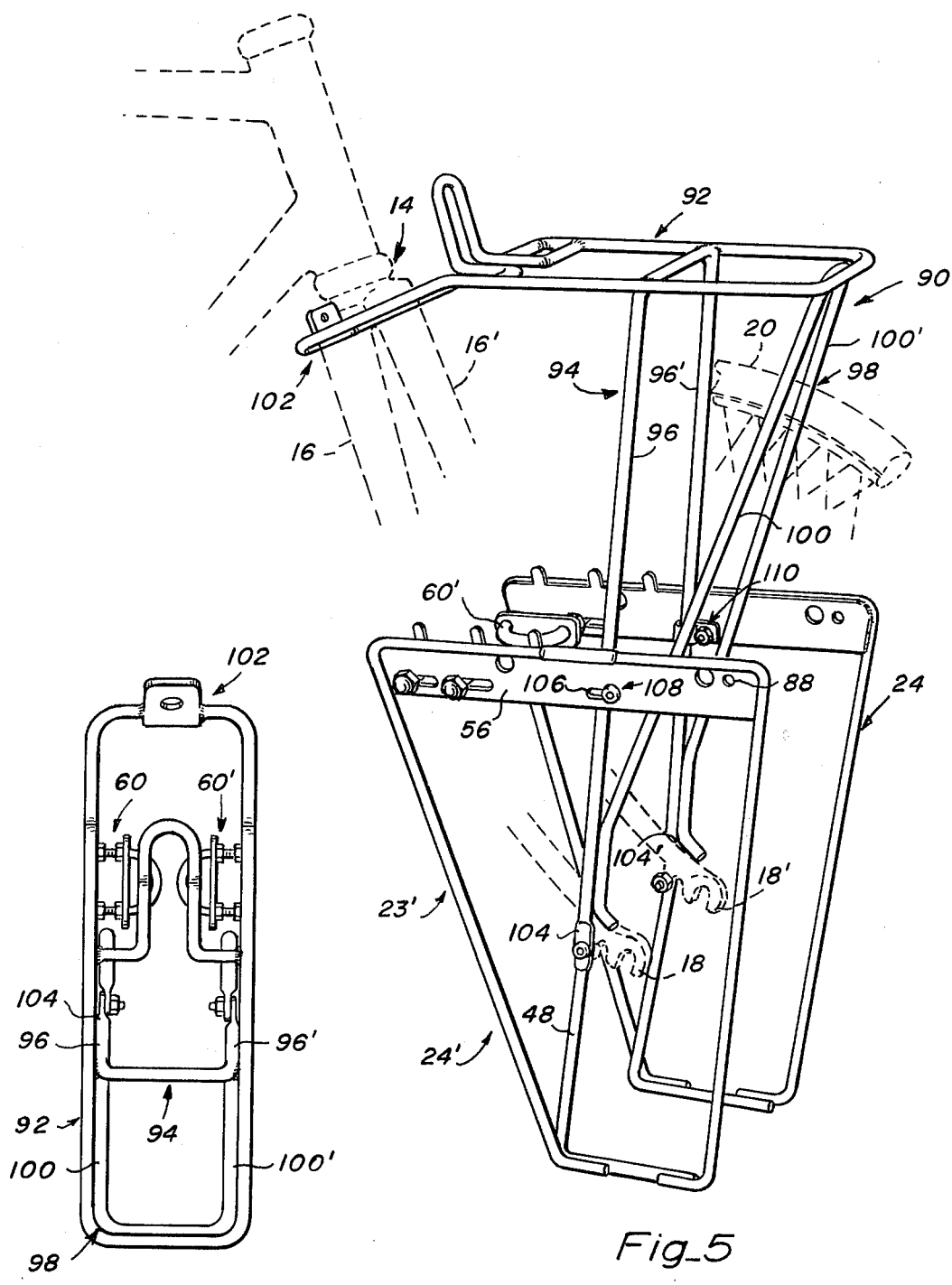
Fig_5
Fig_6

PANNIER CARRIER FOR BICYCLES

CROSS-REFERENCE TO A RELATED APPLICATION

This application is related to my co-pending design application Ser. No. 263,777, filed May 15, 1981, and entitled "Design for Pannier Carrier for Bicycle."

BACKGROUND OF THE INVENTION

1. Field of the Invention

This invention relates generally to bicycle accessories, and more particularly to load supporting or carrying racks which can be rigidly attached to a bicycle.

2. Description of the Prior Art

The optimum distribution and placement of weight on a touring bicycle has long been the subject of debate. Most available material on how bicycles handle is concerned with their basic dynamics. Of particular interest is the relationship between rider and bicycle. The bicycle is stable only because of the rider's ability to constantly correct his line of direction. This fact has led to the realization that any weight should be carried in a position which will cause the least interference with the cyclist's ability to correct and balance the bicycle.

My prior U.S. Pat. No. 4,154,382, issued May 15, 1979, discloses a bicycle rack of the kind intended to support a load above an associated wheel of a bicycle. In order to achieve optimum performance and safety in the handling of a bicycle, however, it has been found that pannier carriers must be employed. For best performance, it has been found that medium-sized panniers should be mounted as far forward as possible on the rear of the bicycle, with medium-sized bags being mounted low on the front forks in the center of the front wheel of the bicycle. This combination has been found in tests to give the best handling with heavy weight. The bicycle responds slower this way than it does with no weight at all, but in most cases is actually more stable than when unweighted. The result is similar to increasing the fork rake or head angle. Clearance for the rotating heels of the bicyclist is maintained, and no frame whip has been noted. The steering of the bicycle feels secure during downhill runs.

Although performance and safety are the primary factors to take into consideration when determining optimum distribution and positioning of weight on a bicycle, some other factors must be taken into account. While most items will readily fit into pannier bags, sleeping rolls and pads usually are loosely attached to the top of a rear rack. Further, a small, light handlebar bag is handy for personal items such as maps, cameras, snacks, wallets, and the like. The bicycle frame's main triangle is an excellent place for weight, but is too limited a space to provide carrier bags. It is usual practice to carry water bottles and a frame-mountable tire pump in this triangular area, which articles will not interfere with the bicyclist's peddling motion.

When weight is carried where the bicycle can handle it best, the ride is much more enjoyable, and a great deal safer. Balanced weight distribution results in reduced mechanical failures as well, including less tire wear and fewer bothersome flat tires or broken spokes.

SUMMARY OF THE INVENTION

It is an object of the present invention to provide a pannier carrier for the front wheel of a bicycle which will permit a load to be carried relatively low with respect to an axis of rotation of the associated wheel.

It is another object of the present invention to provide a pannier carrier for the front wheel of a bicycle which can be mounted on a wide variety of bicycles in a simple, yet rigid manner.

Yet another object of the present invention is to provide a pannier carrier which can be used in conjunction with a front article support rack on a bicycle.

Briefly, the present invention includes a pair of substantially identical but mirror-imaged frameworks arrangeable on respective sides of an associated front wheel of a bicycle so as to permit carrying bags to be mounted substantially centered with respect to an axis of rotation of the associated wheel. Each of the frameworks is formed from a length of rod bent into the shape of a trapezoid and having a connecting bracket permitting the framework to be mounted to an associated one of the branches of a turning fork of the bicycle. This is accomplished by attachment of a connecting bracket portion of the framework to the apertured lug normally provided on the branches of a turning fork of a bicycle adjacent the axle of a wheel mounted on the turning fork. The framework is also secured to the associated branch of the turning fork of the bicycle by use of a U-shaped clamp secureable to a plate affixed to the framework adjacent the uppermost portion thereof. The pair of frameworks is rigidified with respect to one another by use of a spreader bar of generally U-shaped configuration and arrangeable passing around the associated wheel so as to be attached to each of the frameworks. The spreader bar can have a support rack provided at its top portion for increasing the load carrying area of the carrier.

An advantage of the invention is that weight can be distributed on the bicycle, and more specifically the front wheel area of the bicycle, in an optimum manner permitting safe handling of the bicycle.

Another advantage of the present invention is that it can be easily mounted on a wide variety of sizes and styles of bicycles.

A still further advantage of the present invention is the use of a spreader bar, which can have an article support rack, permitting a single carrier device to be adapted to the particular needs of a specific bicyclist.

IN THE DRAWING

FIG. 1 is a fragmentary, perspective view, partly in section, showing a pannier carrier according to the present invention mounted on the turning fork of a bicycle, and with one carrying bag shown in position;

FIG. 2 is a fragmentary, exploded perspective view showing the manner of attachment to an associated branch of a turning fork of a bicycle of a carrier as seen in FIG. 1;

FIG. 3 is a top plan view of the pannier carrier seen in FIG. 1;

FIG. 4 is a front elevational view of the pannier carrier seen in FIGS. 1 and 3;

FIG. 5 is a perspective view, with portions of an associated bicycle shown in broken lines, of a pannier carrier according to the present invention being provided with an article support rack; and FIG. 6 is a top plan view showing the pannier carrier of FIG. 5

DESCRIPTION OF THE PREFERRED EMBODIMENTS

Referring now more particularly to FIG. 1 of the drawing, a bicycle 10 of generally conventional construction has a turning fork 12 journalled in a fork crown 14 and having a pair of slightly divergent, generally coextensive branches 16 and 16'. The latter terminate in the sockets 18 and 18', respectively, which receive an axle (not shown) of a front wheel 20 in a conventional manner. As is conventional with touring bicycles, and the like, each of the branches 16, 16' of turning fork 12 is provided adjacent the sockets 18, 18' with a respective apertured lug 22 and 22', best seen in FIG. 2. Attached to these lugs 22, 22' and to the longitudinal extents of branches 16, 16' of turning fork 12 is a pannier carrier 23 including left and right side members 24 and 24' according to the present invention and to be described in detail below.

Referring now to FIGS. 2 through 4 of the drawing in conjunction with FIG. 1, the construction of side members 24, 24' will now be described. Since the side members 24 and 24' are mirror images of each other, the construction of only one of the side members will be described herein.

Side member 24' includes an open framework 26 comprising a length of rod 28 having ends 30 and 32 and formed into a trapezoidal configuration with a pair of substantially parallel top and bottom parts 34 and 36, and a pair of nonparallel rear and front parts 38 and 40. Part 34 is longer than part 36 and is arranged above an axis of rotation a—a of an associated wheel 20 as defined by the sockets 18 and 18' of turning fork 12. Part 36, which is the shorter of the parallel parts 34, 36 is formed by the ends 30, 32 of tubing 26, which ends 30 and 32 are disposed in spaced relation to one another to form a gap between them.

Framework 26 is attached to branch 16 of turning fork 12 by a connecting bracket 42 having a leg 44 arranged affixed in a conventional manner, such as brazing, to part 36 of framework 26 and having a portion 46 formed intermediate the length of leg 44 and disposed in the gap formed by the ends 30 and 32 of rod 28 for facilitating attachment of a carrying bag (not shown) to framework 26. Leg 44 is one of a pair of legs of bracket 42, the outer being leg 48, included by an acute angle. Leg 48 extends from leg 44 toward the side 34 of framework 26 and terminates internally of framework 26 with a connector 50 in the leg 48, and therefore bracket 42 and framework 26, onto the associated lug at 22 of turning fork 12 of a bicycle 10 on which framework 26 is to be mounted.

Attachment of framework 26 to branch 16 of turning fork 12 is also accomplished by an arrangement including a plate 56 affixed in a suitable manner, as by brazing, to framework 26 immediately adjacent to side 34 and provided with a pair of elongated openings 58 adjustably engageable by standoff 60 having a pair of substantially parallel arms 62 which have threaded portions which fit through openings 58. A clamp bar 64 held in place by a pair of conventional nuts 66 secures standoff 60 to the associated branch 16 of turning fork 12 intermediate the longitudinal extent thereof, with standoff 60 itself being retained on framework 26 as by securing the threaded portions of arm 62 in the openings 58 by use of further conventional nuts 66 and lock nuts 66'.

It will be appreciated that framework 26' of carrier 24 is provided with a standoff 60' identical in construction to standoff 60 for securing framework 26' to branch 16' of turning fork 12. The standoffs 60, 60' function to space the rear portion of the side members 24, 24' from the associated sloping branches 16, 16' of turning fork 12, and place the members 24, 24' in substantially parallel vertical planes.

A plurality of projections 68 and 68' are advantageously provided on a plate 56 associated with a respective one of the frameworks 26 and 26' in order to facilitate retention on the associated framework 26, 26' of a conventional carrier bag such as that designated 70 and shown mounted on framework 26' in FIG. 1. As is also conventional, loops may be provided at the lower portion of such a bag 70 for receiving a conventional elastic strap 72 connected at the ends thereof by a suitable hook 74 which engages with the hook-receiving portion 46 of leg 44 of connecting bracket 42 preferably in the manner seen in FIG. 1. It will be appreciated that a bag such as bag 70 can be mounted on framework 26 in a similar manner (not shown).

In the embodiment illustrated in FIGS. 1 through 4, the frameworks 26 and 26' are separated and rigidified by a spreader bar 76 of generally U-shaped configuration and comprising two substantially parallel and coextensive side rails 78 and 78' each having a respective attachment portion 80 and 80' terminating same and connected together by a back portion 82 spaced from the portions 80, 80'. The latter permits attachment of rail 78 and 78', and therefore spreader bar 76, to lugs 22 and 22' by mounting of same, as seen in FIG. 2 for lug 22, on the same bolt 52 which secures leg 48 of bracket 42 to the associated apertured lug.

Each of the rails 78, 78' is also secured to a respective one of the frameworks 26, 26' by a respective one of the illustrated hose-type clamps 84 and 84'. Clamp 84, which is typical, is of a conventional nature as commonly employed to secure a length of hose, and the like, in proper position, in that it includes a length of webbing apertured at the end portions thereof and wrapped around the tubing forming bar 76 so as to be secured to plate 56 as by a conventional bolt and nut assembly 86 passing through a hole 88 (see FIG. 5) provided in plate 56.

As can be readily appreciated from FIG. 1, spreader bar 76 secured to frameworks 26 and 26' as described above will act to both spread and rigidify frameworks 26 and 26' as mounted on turning fork 12 of a bicycle 10. Back portion 82 of bar 76 is arranged for clearing wheel 20 of bicycle 10.

Referring now more particularly to FIGS. 5 and 6 of the drawing, there is illustrated an embodiment 23' of the invention wherein side members 24 and 24' as described above have combined therewith an article support rack 90 supported by a spreader bar. This support rack 90 includes an elongated, substantially horizontal, article support frame 92, having an upper side, a lower side, a forward end, and a rearward end, the frame being substantially symmetrical about a longitudinal axis extending between its ends. A U-shaped main strut 94 which functions in the manner of spreader bar 76 is attached to a midlength portion of support frame 92 so that legs 96 and 96' thereof extend downwardly from frame 92. A substantially V-shaped lateral bracing strut 98 is attached to the forward end of support frame 92 so that the two legs 100 and 100' thereof extend downwardly to attach to respective legs 96 and 96' of main strut 94. An elongated connecting bracket assembly 102 extends from the rearward end of frame 92 and is spaced from the point of attachment of strut 98 so as to fit easily most bicycles with an attachment to fork crown 14, as by the illustrated screw, at a point behind crown 14 with respect to support frame 92.

Each of the legs 96 and 96' of strut 94 terminates in spaced relation to support frame 92 in a connector portion 104 and 104', respectively, which is mountable on an associated one of the apertured lugs 22 and 22' in the same manner as are attached thereto the attachment portions 80 and 80' of spreader bar 76. A further securing of legs 96 and 96' to a respective framework 26 and 26' is accomplished by a clamping similar to that provided for spreader bar 76, but in a different portion of the associated framework 26, 26'. The clamping to plate 56 of framework 26 is typical, and is carried out by provision of an elongated slot 106 arranged intermediate the longitudinal extent of plate 54 for receiving a conventional screw fastener 108, and the like, which secures an associated hose-type clamp 110 in place in a manner similar to the securing of clamp 84. The provision of an opening in plate 56 for receiving fastener 108 in the form of the elongated slot 106 permits adjustment of strut 94 to allow rack 90 to be fitted on a variety of different sizes and types of bicycle 10.

As can be readily understood from the above description and from the drawing, a pannier carrier according to the present invention permit a wide variety of bicycles available on the market to be fitted with carrying bags positioned centrally of the axis of rotation of a front wheel of the bicycle in order to provide an optimum distribution of weight without effecting the handling and safety of the bicycle. The carrier can be easily installed with conventional tools, it being preferrable to provide the various fastener hardware with Allen-type heads in order to make them compatible with wrenches (not shown) normally carried in a bicycle tool kit. Construction of the frameworks, spreader bar, and support rack, which may be furnished in kit form in order to give the bicyclist a choice as to how the bicycle is to be fitted, can be from lightweight aluminum alloys, and the like, for combined strength and light weight. Installation of the spreader bar, either with or without a rack, is possible by provision of the holes and slots for each mode in a single plate attached to the uppermost portion of an associated carrier framework.

While the invention has been particularly shown and described with reference to certain preferred embodiments, it will be understood by those skilled in the art that various alterations and modifications in form and detail may be made therein. Accordingly, it is intended that the following claims cover all such alterations and modifications as fall within the true spirit and scope of the invention.

What is claimed is:

1. A pannier carrier for a bicycle including a turning fork having a pair of branches journalling a bicycle wheel, the carrier comprising, in combination:
   (a) frame means including left and right carrying bag supporting side members disposed on respective ones of the branches of an associated turning fork for being substantially centered with respect to an associated wheel journalled on the turning fork, the side members of the frame means each including an open framework normally arranged in a substantially vertical plane and comprising a top part, a front part, a bottom part, and a rear part;
   (b) attachment means provided on the frame means for connecting the side members to an associated turning fork, said attachment means including a connecting bracket having a pair of legs joined together so as to intersect at an acute angle, one of the legs partially forming the bottom part of one of the frameworks, and the other of the legs extending upwardly toward the top part of the framework and terminating internally of the framework, with connector means terminating the other of the legs for attaching the framework on an associated branch of a turning fork of a bicycle on which the frame means is to be mounted; and
   (c) spreader means connected to the frame means for spreading and rigidifying the side members.

2. A carrier as defined in claim 1 wherein the attachment means further includes a plate affixed to each one of the frameworks immediately adjacent the top part of the framework and provided with a pair of spaced openings, a generally U-shaped standoff arrangeable around an associated branch of a turning fork of a bicycle and having a pair of arms extending through the openings provided in the plate, a bar mounted on the arms for clamping an associated turning fork branch against the standoff, and fastener means engageable with the legs of the U-shaped member for securing the member on the plate in spaced relation to the bar so as to space the rear part of the framework from the associated turning fork branch and place the frameworks in substantially parallel planes.

3. A carrier as defined in claim 2 further including retaining means comprising a plurality of upwardly extending tabs and provided on the plate of the attachment means for facilitating mounting of a carrier bag on the framework.

4. A carrier as defined in claim 3 wherein the bottom part of the framework forms a gap, the one of the legs of the connecting bracket bridging the gap formed in the bottom part of the framework, and hook-receiving means provided in the one of the legs and arranged in the gap formed in the bottom part of the framework for further facilitating mounting of a carrier bag to the framework.

5. A carrier as defined in claim 4 wherein each of the open frameworks is a mirror-image of the other, the frameworks being arrangeable in parallel, spaced, coextensive relation on respective sides of an associated bicycle turning fork.

6. A carrier as defined in claim 5 wherein turing fork branches of an associated bicycle are substantially coextensive, and the spreader means includes a spreader bar of generally U-shaped configuration and comprising two side rails joined by a bight portion, the side rails being attachable to respective ones of the pair of frameworks and to respective branches of the turning fork of the bicycle at the points of attachment of the connecting bracket of each of the frameworks to the associated turning fork, the bight portion at the spreader bar being arranged for clearing a wheel journalled on the associated turning fork.

7. A carrier as defined in claim 6 wherein the spreader bar further includes an elongated, substantially horizontal, article support frame means having an upper side, a lower side, a forward end, and a rearward end, the article support frame means being substantially symmetrical about a longitudinal axis extending between its ends; connector means extending from the rear end of the article support frame means for attaching the latter to an associated turning fork, and the bight portion of the spreader bar being attached to and partially forming the article support frame means, the spreader bar forming a main supporting strut for the article support frame means.

8. A carrier as defined in claim 1 wherein turning fork branches of an associated bicycle are substantially parallel and coextensive, and the spreader means includes a spreader bar of generally U-shaped configuration and comprising two side rails joined by a bight portion, the side rails being attachable to respective ones of the pair of frameworks and to respective branches of the turning fork of the bicycle at the points of attachment of the connecting bracket of each of the frameworks to the associated turning fork, the bight portion at the spreader bar being arranged for clearing a wheel journalled on the associated turning fork.

9. A carrier as defined in claim 8 wherein the spreader bar further includes an elongated, substantially horizontal, article support frame means having an upper side, a lower side, a forward end, and a rearward end, the article support frame means being substantially symmetrical about a longitudinal axis extending between its ends; connector means extending from the rear end of the article support frame means for attaching the latter to an associated turning fork, and the bight portion of the spreader bar being attached to and partially forming the article support frame means, the spreader bar forming a main supporting strut for the support frame means.

10. A pannier carrier for a bicycle including a turning fork having a pair of branches journalling a bicycle wheel, comprising:
   frame means including left and right bag supporting side members disposed on respective ones of the branches of an associated turning fork for being substantially centered with respect to an associated wheel journaled on the turning fork, said side members each including an open framework normally arranged in a substantially vertical plane and including a top part having a first length extending horizontally in a plane parallel to the direction of normal bicycle motion, a bottom part having a second length shorter than said first length, a front part connecting the front ends of said top and bottom parts and a rear part connecting the rear ends of said top and bottom parts;
   means for attaching each said side member to an associated branch of said turning fork and including first fastening means for attaching the upper rearward portions of each said side member to an associated branch of said turning fork, elongated connecting members affixed to each said bottom part and extending upwardly therefrom and terminating internally of the associated framework with a distal end of each connecting member having second fastening means for attachment to a branch of said turning fork, and third fastening means affixed to a forward portion of each said side member; and
   a generally U-shaped spreader means having an extremity of one leg thereof connected to the distal end of one of said connecting members and an extremity of the other leg thereof connected to the distal end of the other of said connecting members, said legs being disposed to slope forwardly with a midportion of each said leg being attached to a forward portion of an associated side member by said third fastening means for spreading and rigidifying said side members.

11. A carrier as defined in claim 10 wherein the recited means for attaching further includes:
   a pair of plates respectively affixed to the side members immediately adjacent the top parts thereof with each said plate being provided with a pair of spaced openings,
   a pair of generally U-shaped standoffs forming a part of said first fastening means, each being arrangeable around an associated branch of said turning fork, the arms of said standoffs extending through the openings provided in the plates, a bar mounted on the arms of each said standoff for clamping the associated turning fork branch against the associated standoff, and means engageable with the legs of the U-shaped members for securing said members on the plate in spaced relation to said bars so as to space the rear part of each said side member from the associated turning fork branch and place the side members in substantially parallel planes.

12. A carrier as defined in claim 10 further including a pair of plates respectively affixed to said top parts, with each said plate having a plurality of upwardly extending tabs for facilitating the mounting of a carrier bag on each said framework.

* * * * *